US012240738B2

(12) United States Patent
Urban

(10) Patent No.: US 12,240,738 B2
(45) Date of Patent: Mar. 4, 2025

(54) TELESCOPIC JIB WITH SWING-OUT MAST

(71) Applicant: Tadano Demag GmbH, Zweibrücken (DE)

(72) Inventor: Christian Moritz Urban, Zweibrücken (DE)

(73) Assignee: Tadano Demag GmbH, Zweibrücken (DE)

( * ) Notice: Subject to any disclaimer, the term of this patent is extended or adjusted under 35 U.S.C. 154(b) by 384 days.

(21) Appl. No.: 17/635,233

(22) PCT Filed: Aug. 11, 2020

(86) PCT No.: PCT/EP2020/072451
§ 371 (c)(1),
(2) Date: Feb. 14, 2022

(87) PCT Pub. No.: WO2021/032529
PCT Pub. Date: Feb. 25, 2021

(65) Prior Publication Data

US 2022/0219952 A1 Jul. 14, 2022

(30) Foreign Application Priority Data

Aug. 16, 2019 (DE) ..................... 10 2019 122 071.8

(51) Int. Cl.
*B66C 23/70* (2006.01)
*B66C 23/42* (2006.01)
*B66C 23/82* (2006.01)

(52) U.S. Cl.
CPC ............ *B66C 23/701* (2013.01); *B66C 23/42* (2013.01); *B66C 23/828* (2013.01); *B66C 2700/0371* (2013.01)

(58) Field of Classification Search
CPC ......... B66C 23/04; B66C 23/06; B66C 23/42; B66C 23/64; B66C 23/66; B66C 23/68;
(Continued)

(56) References Cited

U.S. PATENT DOCUMENTS

| | | | | |
|---|---|---|---|---|
| 2,698,096 A | | 12/1954 | Hughes | |
| 3,620,379 A | | 11/1971 | Fauchere | |
| 4,982,853 A | * | 1/1991 | Kishi | B66F 11/046 212/230 |

(Continued)

FOREIGN PATENT DOCUMENTS

| | | | | |
|---|---|---|---|---|
| CN | 102602827 A | * | 7/2012 | B66C 23/821 |
| CN | 104528552 A | | 4/2015 | |

(Continued)

OTHER PUBLICATIONS

International Search Report and Written Opinion of the International Searching Authority in English from corresponding Patent Cooperation Treaty (PCT) Application No. PCT/EP2020/072451, indicated completed on Nov. 11, 2020.

(Continued)

*Primary Examiner* — Michael R Mansen
*Assistant Examiner* — Henrix Soto
(74) *Attorney, Agent, or Firm* — Gardner, Linn, Burkhart & Ondersma LLP

(57) ABSTRACT

A telescopic jib includes a main box, at least one inner box and at least one swing-out mast. The mast is arranged on the inner box such that the inner box is able to be pushed into the main box together with the mast in a swung-in or folded-in position to thereby provide a telescopic jib that more easily provides an increased load-bearing capacity. In a particular configuration such a telescopic jib is disposed on a vehicle crane having wheels, axles, a lower carriage and a superstructure, with the telescopic jib mounted to the superstructure.

19 Claims, 8 Drawing Sheets

(58) Field of Classification Search
CPC ..... B66C 23/70; B66C 23/701; B66C 23/702; B66C 23/82; B66C 23/821; B66C 23/823; B66C 23/826; B66C 23/828
USPC .......................................................... 212/299
See application file for complete search history.

(56) References Cited

U.S. PATENT DOCUMENTS

| | | | | |
|---|---|---|---|---|
| 5,597,078 A * | 1/1997 | Becker | B66C 23/42 212/231 |
| 7,044,315 B2 * | 5/2006 | Willim | B66C 23/701 52/118 |

FOREIGN PATENT DOCUMENTS

| | | | | | |
|---|---|---|---|---|---|
| CN | 104555760 | A | | 4/2015 | |
| CN | 108100872 | A | | 6/2018 | |
| DE | 2258807 | A | | 6/1974 | |
| DE | 20203443 | U1 | * | 5/2003 | B66C 23/42 |
| DE | 20219126 | U1 | | 4/2004 | |
| DE | 202005003207 | U1 | * | 8/2006 | B66C 23/826 |
| DE | 202005016743 | U1 | * | 5/2007 | B66C 23/702 |
| DE | 202014006460 | U1 | | 11/2015 | |
| DE | 102016007203 | A1 | * | 12/2017 | B66C 23/823 |
| EP | 1213254 | A1 | * | 6/2002 | B66C 23/701 |
| JP | S4843209 | B | | 12/1973 | |
| JP | 102209394 | A | | 8/1990 | |
| JP | 2011195236 | A | | 10/2011 | |
| WO | WO-2018029306 | A1 | * | 2/2018 | B66C 23/702 |

OTHER PUBLICATIONS

Preliminary Report on Patentability of the International Searching Authority in English from corresponding Patent Cooperation Treaty (PCT) Application No. PCT/EP2020/072451, issued Feb. 17, 2022.

* cited by examiner

TELESCOPIC JIB WITH SWING-OUT MAST

CROSS REFERENCE TO RELATED APPLICATION

The present application claims the priority benefits of International Patent Application No. PCT/EP2020/072451, filed Aug. 11, 2020, and claims benefit of German patent application DE 10 2019 122 071.8, filed Aug. 16, 2019.

BACKGROUND AND FIELD OF THE INVENTION

The invention relates to a telescoping jib with a basic box, at least one inner box and at least one mast which can be folded out.

From the German utility model DE 202 19 126 U1 a guying arrangement for a telescoping jib of a crane with a guying mast on one of the telescoping sections is known.

A comparable guying arrangement is also known from German utility model DE 20 2014 006 460 U1.

Furthermore, from German laid-open document DE 2 258 807 A a mobile crane with a telescoping jib is already known, which, in a conventional manner, comprises a basic box and at least one inner box which can be pushed in and out. In addition, in the innermost inner box, a further inner box is arranged which can be pushed in and out and is referred to as a tip jib. The extended tip jib can be guyed with respect to the telescoping jib via two mast supports which can be folded out into a guying position. For this purpose, the two mast supports are pivotably mounted on a roller head of the innermost inner box and can be placed in an inoperative position on top of the basic box when the tip jib is retracted.

According to both disclosures, the guying masts are each arranged on the head of a telescoping section and so they can be mounted or dismounted. In relation to telescoping jibs without a guying mast such telescoping jibs have the disadvantage that they are harder to handle, especially when the guying mast is not required for lifting a load. Outlay for transporting and mounting the telescoping jib is also higher.

SUMMARY OF THE INVENTION

The present invention provides a telescoping jib on which an increase in load-bearing capacity with lower handling, transport and mounting outlay is rendered possible.

In accordance with the invention, in the case of a telescoping jib with a basic box, at least one inner box and at least one mast which can be folded out, a simplified increase in load-bearing capacity is achieved in that the mast is arranged on the inner box in such a way that the inner box can be pushed into the basic box together with the mast in the folded-in position.

In other words, the inner box and the folded-in mast are formed in such a way that the common clearance profile thereof is smaller than a receiving cross-section of the basic box. In this way, any cross-sectional shape for the fold-out mast, the inner box and the basic box is possible in principle. Therefore, the mast can remain on the inner box in the transport position or inoperative position, when said inner box is pushed into the basic box in a telescoping manner and therefore does not have to be laboriously attached or detached. In its inoperative position, preferably in every position, the mast preferably does not protrude beyond the overall length of the basic box and inner box, i.e. not even when the inner box is pushed into the basic box.

An increase in load-bearing capacity can easily be achieved in that the mast is folded out when required and guyed, e.g. in relation to the telescoping jib head. It is also possible for a jib extension to be attached to the telescoping jib head and for the mast then to be guyed in relation to the jib extension. In this way, a lever arm is produced between the telescoping jib or the jib extension and the mast, in particular the longitudinal position on the mast—e.g. the mast end on which the guying arrangement is articulated. The mast and the associated guying arrangement are thus used as aids for the application of a retaining force on the telescoping jib, preferably on the telescoping jib head thereof. Therefore, the raising or lowering of greater loads than in normal operation (without a mast) is possible. In terms of the invention, guying also includes pretensioning.

With the telescoping jib in accordance with the invention, the outlay in terms of costs and time for transportation and mounting can be reduced. In addition, a compact construction for the telescoping jib in the retracted position is achieved since the mast does not protrude beyond the cross-section of the basic box. Handling is facilitated especially during use without an increase in load-bearing capacity compared with prior art telescoping jibs with guying brackets since no limitation arises with the telescoping jib in accordance with the invention compared with a telescoping jib without an apparatus for increasing the load-bearing capacity.

In a particularly advantageous manner, provision is made for a plurality of inner boxes, which are also referred to a telescoping sections, to be arranged one inside another and together in the basic box, the mast being arranged on the innermost inner box and the innermost inner box together with the mast being able to be pushed into the second-innermost inner box in the folded-in position. In this embodiment, the innermost inner box and the folded-in mast are formed in such a way that the common clearance profile thereof is smaller than a receiving cross-section of the second-innermost, i.e. next outermost, inner box. The mast which can be folded out can remain on the innermost inner box when this box is pushed into the second-innermost inner box. In its inoperative position, preferably in every position, the mast does not protrude beyond the overall length of the basic box and all inner boxes, i.e. not even when all inner boxes are pushed into the basic box.

In an alternative embodiment, parts of the last inner box together with parts of the mast, in particular the head part with cable pulleys, protrude out of the second-innermost inner box. This has the advantage that even larger pulleys and larger cable diameters can be used for the guying arrangement.

In one embodiment, provision is made for the mast to be C-shaped and to partially surround the inner box. In this way it is ensured that the mast is resistant to twisting and yet the clearance profile of the inner box is not expanded. In terms of the invention, C-shaped means that the mast comprises a base, which extends in the longitudinal direction of the inner box and is preferably planar, and limbs which spread therefrom in the peripheral direction and are preferably linear. The mast can be e.g. in the form of a half-shell and partially surround the inner box. However, other surrounding angles for the limbs are also possible. Alternatively, the mast can also be formed wholly or partially as a hollow body.

In a further embodiment, provision is made for the inner mast to comprise a further mast. Both masts which can be folded out are preferably arranged on the periphery of the inner box and/or in relation to the longitudinal direction thereof on a middle axis in a mirrored arrangement.

In a constructionally simple manner, provision is made for the angle of spread formed between the masts in the folded-out position to be adjustable. The adjustment is preferably carried out by a corresponding arrangement of the fold-out joint on the periphery of the inner box.

In a particularly preferred manner, a connecting means, preferably a cable or a strut, is arranged between the masts in the folded-out position and is fastened in each case to the mast, preferably to the free end thereof. By this connecting means it is preferably ensured that the adjusted angle of spread does not change during raising and/or lowering of the load. In addition, transverse bending of the masts is reduced by the connecting means. When a cable is used, this cable is arranged in such a way that, with the mast folded in and the telescoping jib retracted, it can be jointly transported having been mounted thereon.

In an advantageous manner, one or each mast comprises a deflection means, preferably a pulley, which is preferably arranged at the free end thereof. This is arranged in such a way that, with the mast folded in and the telescoping jib retracted, it can be jointly transported having been mounted thereon. The deflection means serves to deflect a connecting means, in particular a cable, which is used for the guying of the mast. Alternatively, the deflection means can be arranged on the telescoping jib head or in the region of the telescoping jib foot.

In a particularly advantageous manner, provision is made for one or each mast to be able to be guyed in the folded-out position in relation to a telescoping jib head by a connecting means. The connecting means can be arranged in such a way that, with the mast folded in and the telescoping jib retracted, it can be jointly transported having been mounted thereon.

In a constructionally simple manner, provision is made for the connecting means to be a rod or cable and so the mast tip is arranged at a preset distance in the direction towards the telescoping jib head, and/or for the connecting means to be a cable and so the mast is able to be guyed in such a way that the angle between the mast and the telescoping jib head is variably adjustable in a range between 10 degrees and 170 degrees, preferably between 30 degrees and 110 degrees. The distance of the mast, in particular of the mast tip, from the inner box, the position of the fastening of the mast to the inner box and by reason of the type of articulation of the mast on the inner box therefore also the angle between the mast and inner box can thus be selected in a fundamentally individual manner. In this way, the desired lever arm, or the lever arm required for raising and lowering the load, between the mast and telescoping jib can be adjusted. When a rod is used for the guying arrangement the distance or the angle is to be selected prior to mounting of the rod. When a cable is used the distance or angle can be modified even during operation. In order to adjust the distance or angle the cable length is modified, in particular by means of a winch on the inner box. For this purpose, the deflection means can also be used on the mast.

It is also of particular advantage for one or each mast to be able to be erected by means of an auxiliary apparatus which preferably comprises a telescopable cylinder and/or a cable pull. For this purpose, the auxiliary apparatus is arranged and fastened at one of its ends on the inner box and arranged and fastened at its other end on the mast. The fastenings are preferably mounted in a rotationally articulated manner and so the change in the angle between the auxiliary apparatus and mast taking place during erection of the mast is rendered possible. In the case of corresponding guying of the mast, the auxiliary apparatus is load-free during raising and/or lowering of a load. When the mast is folded in, the auxiliary apparatus extends substantially parallel to the mast. It is also possible for a plurality of masts to be able to be erected by means of only one auxiliary apparatus.

Alternatively, the at least one mast can be used to erect the mast by a telescoping movement of a telescoping cylinder of the appropriate inner box and possibly correspondingly allocated cable pulls. In other words, the mast can be erected without further activity by extending the corresponding inner box. For this purpose, the mast which can be folded out is preferably connected at its free end by a connecting means to the telescoping jib in such a way that outwards telescoping of the inner box leads to pretensioning of the connecting means and so the mast is guyed in the desired way when the inner box is completely extended. A combination with other devices and/or apparatuses, such as e.g. the auxiliary apparatus, is possible.

Provision can also advantageously be made for the further flexible increase in load-bearing capacity of the telescoping jib in that a mast is arranged on a further inner box, is preferably C-shaped and partially surrounds the further inner box. In terms of the invention, a further inner box is to be understood to be any inner box apart from the innermost inner box. Thus, if a further increase in load-bearing capacity is necessary, this can be achieved by means of the mast or masts which can be folded out on the further inner box. As described above, a C-shaped form for the mast ensures that the mast is rigid in compression and yet does not significantly expand the clearance profile of the inner box. Provision is made for this mast also to be able to remain on the inner box when said box is pushed into the next-outermost inner box or into the basic box.

This mast is advantageously applicable to the erection of the mast on the innermost inner box. For this purpose, the mast on a further inner box is preferably erected first and then the mast on the innermost inner box.

In one advantageous embodiment, a foot of the, or of each, mast is arranged adjacent to a region of an overlap of the basic box or of one of the inner boxes with respect to the next-innermost inner box to which the mast is attached. The location of the arrangement point or articulation is preferably located at about 10 to 35% of the overall length of the inner box beginning from the start or from a rear bearing. In other words, the foot of the mast is preferably arranged in the region adjoining the overlap region with respect to the basic box or the next-outermost inner box, and is preferably articulated at that location. In this way, the greatest possible mast length can be ensured and/or a best possible result—in terms of static relief of loading of the telescoping jib—can be achieved. In principle, an arrangement of the foot of a mast in the direction of the telescoping jib head or of the overlap region with respect to half of the inner box orientated towards the next-innermost inner box is possible. In the case of such a variant, guying does not then necessarily take place at the head of the telescoping jib but preferably at an additionally mounted jib extension.

Provision is made in a particularly advantageous manner that, by means of a tensioning frame and of a connecting means, which preferably comprises a cable, one or each mast can be erected and guyed. The tensioning frame comprises a winch frame which is arranged e.g. on the basic box. However, it is also possible for the winch frame to be arranged independently of the telescoping jib. One or a plurality of guying cylinders, which pretension the connecting means in the region of the telescoping jib head or telescoping jib foot with a predetermined force, could be used in conjunction with, or without, a winch frame. Alternatively it is also possible for guying to be carried out only by a connecting means without a tensioning frame, e.g. via a cable or rod. Combinations of the above-mentioned variants are also possible.

In a constructionally simple manner, the tensioning frame comprises a luffing cable cross-member, preferably for multiple cable reeving. By means of the luffing cable cross-member it is possible to ensure guidance of the cable without a very large amount of diagonal pull. In addition, the connecting means can advantageously be deflected via a deflection means between the mast which can be folded and the tensioning frame in the region of a pivot axis of the telescoping jib.

In one embodiment provision is made for one or each mast to be able to be guyed with respect to a foot bearing of the telescoping jib by a connecting means which preferably comprises a cable. The telescoping jib is luffably mounted by means of the foot bearing. Alternatively, one or each mast can be guyed with respect to the basic box of the telescoping jib. However, guying with respect to any other position on the telescoping jib is also possible.

Provision can be advantageously made for an additional mast to be arranged on the telescoping jib, preferably on the basic box, for a further mast to be able to be mounted and for one or each mast which can be folded out to be guyed and/or tensioned by a connecting means via the additional mast. "To be able to be mounted" in terms of the invention means that this additional mast cannot be inserted with one of the inner boxes into the basic box or into one of the next-outermost inner boxes. The additional mast which can be mounted is attached at the operating location of the telescoping jib.

The invention also relates to a vehicle crane which comprises a telescoping jib in accordance with the invention. A telescoping jib of this type ensures an increase in load-bearing capacity for lower outlay in terms of handling, transport and mounting and ensures a higher level of safety for the vehicle crane, in particular when the crane is travelling with the telescoping jib retracted. In the present case, a vehicle crane is understood to be a mobile crane or crawler crane which can travel on the road or rails.

In one advantageous embodiment provision is made for one or each mast to be able to be guyed with respect to a superstructure of the vehicle crane by a connecting means. The telescoping jib is luffably mounted by means of the foot bearing which is preferably arranged on the superstructure. The telescoping jib can be luffed and can therefore be erected by means of a luffing cylinder. The vehicle crane comprises a lifting mechanism for raising and/or lowering a load and preferably a tensioning frame with which—as described above—the mast can be guyed. The vehicle crane also comprises a lower carriage on which the superstructure is arranged to be able to rotate about a vertical axis of rotation via a rotational connection. The vehicle crane also has driver's cabin and/or a further cabin on the superstructure. However, it is also possible for the crane to be remotely controlled and therefore only one or no (driver's) cabin is required.

Other applications of the telescoping jib in accordance with the invention are also possible, e.g. fixedly installed on a ship or on a rail-bound or rail-guided crane.

Exemplified embodiments of the invention will be explained in greater detail with reference to the figures and the following description.

DESCRIPTION OF THE PREFERRED EMBODIMENTS

Figure 1:
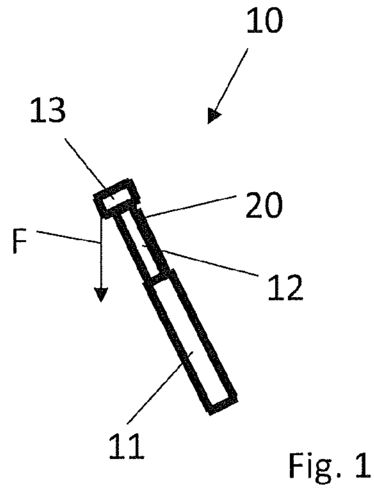
FIG. 1 shows a schematic side view of a telescoping jib with a folded-in mast and inner boxes partially pushed into the basic box.

FIG. 1 shows a schematic side view of a telescoping jib 10. This comprises a basic box 11, an inner box 12 arranged in the basic box 11, and a telescoping jib head 13. The inner box 12 is shown pushed partially into the basic box 11. A mast 20 which can be folded out and which is shown in the folded-in inoperative position is arranged on the inner box 12. The mast 20 is thus in an inoperative position lying on the inner box 12. In the inoperative position, the mast 20 extends with its longitudinal direction parallel to a longitudinal direction of the inner box 12. It is very clear to see that the inner box 12 can be pushed into the basic box 11 together with the mast 20 in the folded-in inoperative position. The inner box 12 and the folded-in mast 20 are formed in such a way that the common clearance profile thereof is smaller than a receiving cross-section of the basic box 11. The mast 20 can therefore remain on the inner box 12 when this box is pushed into the basic box 11 in a telescoping manner. In no position does the mast 20 protrude beyond the overall length of the basic box 11 and inner box 12, i.e. not even when the inner box 12 is pushed into the basic box 11. In the illustrated position of the telescoping jib 10, this jib can be used to raise and/or lower a load, not shown, with the weight F without an increase in load-bearing capacity. For this purpose, a lifting cable, not shown, is deflected over the telescoping jib head 13.

In an alternative embodiment, parts of the fold-out mast 20 of the last inner box 12, 12', in particular a head part with cable pulleys of the fold-out mast 20, protrude from the second-innermost inner box 12". This produces the advantage that even larger cable pulleys and larger cable diameters can be used for the guying arrangement.

Figure 2:
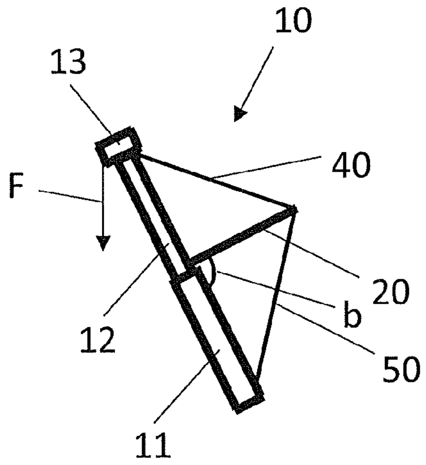
FIG. 2 shows a schematic side view of the telescoping jib according to FIG. 1 with a mast folded out by 90 degrees.
Figure 3:
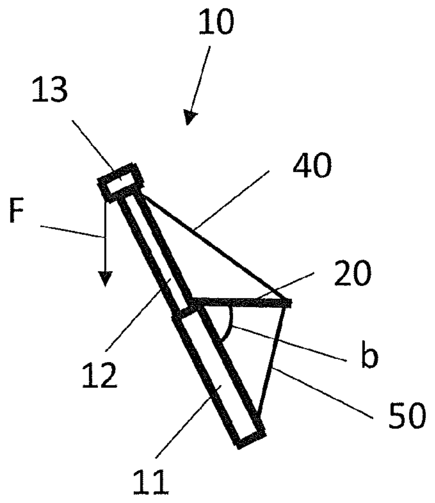
FIG. 3 shows a schematic side view of the telescoping jib according to FIG. 1 with a mast folded out in an inclined manner.

FIGS. 2 and 3 each show a schematic side view of the telescoping jib 10 according to FIG. 1 with the folded-out mast 20. By means of the mast 20 which can be folded out the load-bearing capacity of the telescoping jib 10 can be increased. The inner box 12 is fully extended out of the basic box 11 and the mast 20 folded out. It is also possible for the mast 20 to be formed in a telescopable manner. Connecting means 40, 50 engage at the free end of the mast 20. The connecting means 40, 50 together with the mast 20 form a guying arrangement for the telescoping jib 10.

The connecting means 40 is connected to the telescoping jib head 13, in particular is fastened thereto. The function of the connecting means 40 is also to prevent the mast 20 flipping downwards. The connecting means 40 can be a rod, cylinder and/or a cable. When a rod is used, the mast 20 is arranged at a preset distance from the telescoping jib head 13. The distance or angle b between the mast 20 and the telescoping jib 10 is to be selected prior to mounting of the rod. When a cable is used, the mast 20 can be guyed in such a way that the angle b can be variably adjusted in a range between 10 degrees and 170 degrees, preferably between 30 degrees and 110 degrees. When a cable is used, the distance or angle b can thus be modified even during operation. In order to adjust the distance or angle b the cable length is modified, in particular by means of a winch on the inner box 12. For this purpose, a deflection means 60 can also be used on the mast 20 (see FIG. 5). When a cable is used, the connecting means 40 is arranged in such a way that, with the mast 20 folded in and the telescoping jib 10 retracted, it can be jointly transported having been mounted thereon.

In FIG. 2, the mast 20 is folded out at a angle of b=90 degrees, i.e. at a right angle to the telescoping jib 10, and protrudes downwards. In contrast to this, the mast 20 illustrated in FIG. 3 is folded out at an angle of b<90 degrees, for instance 60 degrees.

The connecting means 50 is connected to the basic box 11, in particular is fastened thereto. It can also alternatively be connected to a tensioning frame 80 and/or a foot bearing 14 (see FIG. 13). The connecting means 50 is preferably of modifiable length and is therefore a cable. The function of the connecting means 50 is also to prevent the mast 20 flipping upwards.

It is very clear to see that when the inner box 12 is in the fully extended position, the mast 20 is arranged with its foot in the region of the inner box 12 adjoining the overlap region with respect to the basic box 11. In this way, a greatest possible mast length can be ensured and/or a best possible result—in terms of static relief of loading of the telescoping jib 10—can be achieved. In principle, an arrangement of the foot of the mast 20 in a position pushed towards the telescoping jib head 13 is also possible.

Figure 4:
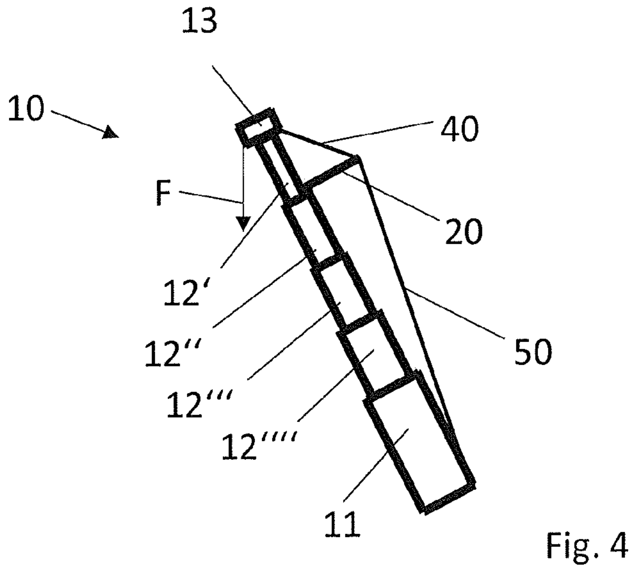
FIG. 4 shows a schematic side view of a telescoping jib with a plurality of inner boxes and a folded-out mast.

FIG. 4 shows a schematic side view of a telescoping jib 10 with a plurality of inner boxes 12', 12", 12'", 12"" and a folded-out mast 20. All descriptions relating to the inner box 12 or inner boxes 12 apply equally to the inner boxes 12', 12", 12'", 12"". The inner boxes 12 are each arranged one inside another and jointly in the basic box 11 and are fully extended. The mast 20 is arranged on the innermost inner box 12'. The innermost inner box 12' can be pushed, together with the mast 20 in the folded-in position, into the second-innermost inner box 12". In this embodiment, the innermost inner box 12' and the folded-in mast 20 are formed in such a way that the common clearance profile thereof is smaller than a receiving cross-section of the second-innermost inner box 12". The mast 20 can remain on the innermost inner box 12' when this box is pushed into the second-innermost inner box 12". In a preferred case, in no position does the mast 20 protrude beyond the overall length of the basic box 11 and all inner boxes 12, i.e. not even when all inner boxes 12 are pushed into the basic box 11.

It is very clear to see that when the innermost inner box 12' is in the fully extended position, the mast 20 is arranged with its foot in the region of the innermost inner box 12' adjoining the overlap region with respect to second-innermost inner box 12". In this way, the greatest possible mast length can be ensured and/or a best possible result—in terms of static relief of loading of the telescoping jib 10—can be achieved. In principle, an arrangement of the foot of the mast 20 in the half of the innermost inner box 12' orientated towards the telescoping jib head 13 is also possible.

Otherwise, the statements relating to FIGS. 1 to 3 also apply to the embodiment illustrated in FIG. 4.

Figure 5:
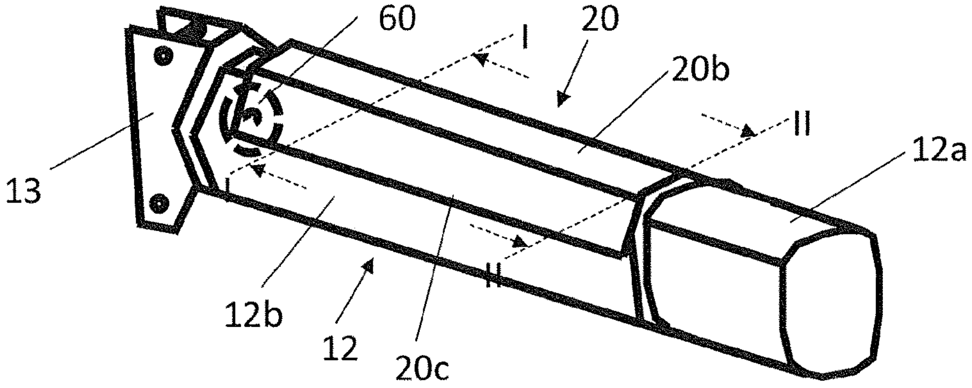
FIG. 5 shows a schematic perspective view of an inner box with a C-shaped mast in the transport position or inoperative position.

FIG. 5 shows a schematic perspective view of an inner box 12. The telescoping jib 10 with a plurality of inner boxes 12 is the innermost inner box 12'. The telescoping jib head 13 is arranged at one end of the inner box 12. At the other end of the inner box 12 is the overlap region **12*a* with respect to the basic box 11 or with respect to the second-innermost inner box 12". The inner box 12 consists of a main support 12*b* and the overlap region 12*a*. The main support 12*b* is adjoined by the overlap region 12*a* and possibly in an opposing arrangement the telescoping jib head 13. The main support 12*b* is a region of the inner box 12 with a smaller cross-section. The cross-sections of the overlap region 12*a* and of the main support 12*b* are shown in a simplified manner as a rectangle and hexagon in the illustration. However, both cross-sections preferably have a mutually tailored shape and are preferably rounded as shown in the cross-sectional view according to FIG. 6**.

The mast 20 is arranged in the region of the main support **12*b*. The mast 20 is C-shaped and partially surrounds the inner box 12 from above in the inoperative position shown at this point. In this way it is ensured that the mast 20 is rigid in compression but does not expand the clearance profile of the inner box 12 and so both can be pushed together into the basic box 11 or into the second-innermost inner box 12". The mast 20, referred to as C-shaped, comprises a planar base 20*b*, which extends in the longitudinal direction of the inner box 12, and limbs 20*c* which spread from the base in the peripheral direction and are preferably linear. Therefore, the mast 20 is substantially half-shell-shaped and partially surrounds the inner box 12 from above. Other surrounding angles for the limbs 20*c*** are also possible.

The mast 20 is connected to the inner box 12 in an articulated manner via one or two fold-out joints **20*a*, not illustrated. Two deflection means 60 (only the front one being shown) are rotatably mounted at the free end of the mast 20. The deflection means 60 are arranged in such a way that, with the mast 20 folded in and the telescoping jib 10 retracted, they can be jointly transported having been mounted thereon. The deflection means 60 is in each case preferably a pulley and serves to deflect the connecting means 40, preferably a cable, which is used for the guying of the mast 20 with respect to the telescoping jib head 13. Alternatively, the deflection means 60 can in each case be arranged on the telescoping jib head 13**.

The mast 20 can be erected by means of an auxiliary apparatus 70, not illustrated, which preferably comprises a telescopable cylinder and/or a cable pull. For this purpose, the auxiliary apparatus 70 is arranged and fastened at one of its ends on the inner box 12 and arranged and fastened at its other end on the mast 20. The fastenings are preferably mounted in a rotationally articulated manner and so the change in the angle between the auxiliary apparatus 70 and mast 20 taking place during erection of the mast 20 is rendered possible. When the mast is guyed accordingly, the auxiliary apparatus 70 is load-free during raising and/or lowering of a load. When the mast 20 is folded in, the auxiliary apparatus 70 extends substantially parallel to the mast.

Figure 6:
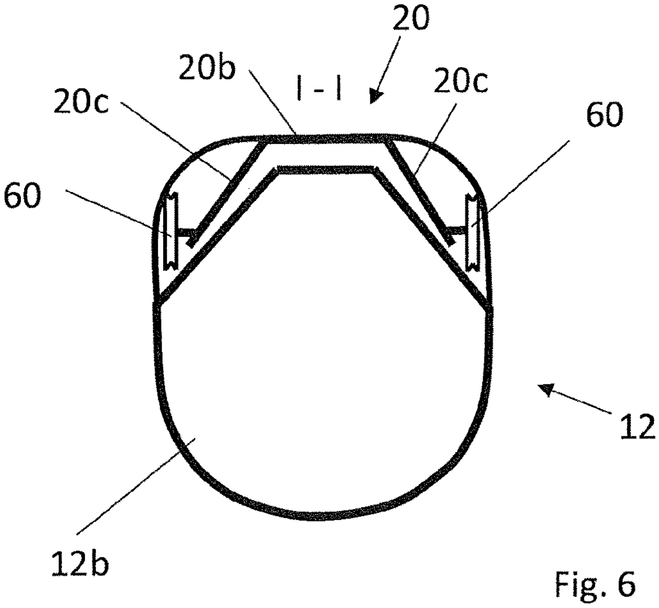
FIG. 6 shows a schematic cross-sectional view (I-I) of the inner box according to FIG. 5.

FIG. 6 shows a schematic cross-sectional view (I-I) of the inner box 12 according to FIG. 5. The C-shaped design of the mast 20 and the surrounding of the main support 12*b* of the inner box 12 are very clear to see.

Figure 7:
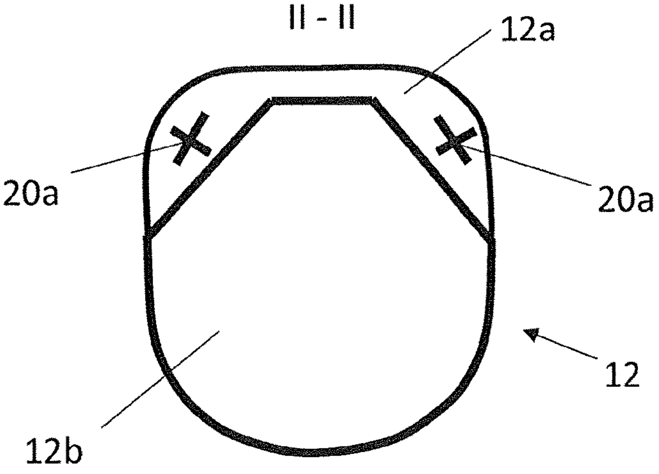
FIG. 7 shows a schematic cross-sectional view (II-II) of the inner box according to FIG. 5.

FIG. 7 shows a schematic cross-sectional view (II-II) of the inner box 12 according to FIG. 5. The two fold-out joints 20*a* by means of which the mast 20 is connected in an articulated manner to a stiffening wall of the overlap region 12*a* of the inner box 12 are very clear to see.

Figure 8:
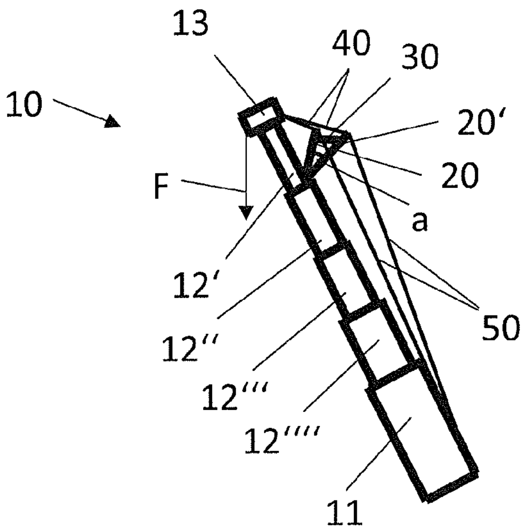
FIG. 8 shows a schematic side view of a telescoping jib with a plurality of inner boxes and two folded-out masts on the innermost inner box.

FIG. 8 shows a schematic side view of a telescoping jib 10 with a plurality of inner boxes 12', 12'', 12''', 12''''. All descriptions relating to the inner box 12 or inner boxes 12 apply equally to the inner boxes 12', 12'', 12''', 12''''. In this embodiment, two masts 20, 20', which can be folded out, are arranged on the innermost inner box 12' and are shown folded out. The masts 20, 20' are arranged on the periphery of the innermost inner box 12' and as a mirror image with respect to the longitudinal direction thereof on a middle axis. In this way, the masts 20, 20' are arranged in the folded-out position in a v-shape next to, and with respect to, each other. A spreading angle a is formed between the masts 20, 20' in the folded-out position. The angle of spread a can be adjusted by a corresponding arrangement of the fold-out joint 20*a* on the periphery of the inner box 12. The connecting means 40, 50 engage each mast 20, 20' respectively at the free end thereof. The connecting means 40, 50 together with the masts 20, 20' form a guying arrangement for the telescoping jib 10. In addition, a connecting means 30, preferably a cable or a strut, is arranged between the masts 20 in the folded-out position and is fastened in each case to the mast 20, 20', preferably to the free end thereof. By this connecting means 30 it is ensured that the adjusted angle of spread a does not change during raising and/or lowering of a load. In addition, transverse bending of the masts 20, 20' is reduced by the connecting means 30. If a cable or a plurality of cables is/are used as connecting means 30, 40, 50, each of the cables is arranged such that, with the mast 20, 20' folded in and the telescoping jib 10 retracted, it can be jointly transported having been mounted thereon.

Figure 9:
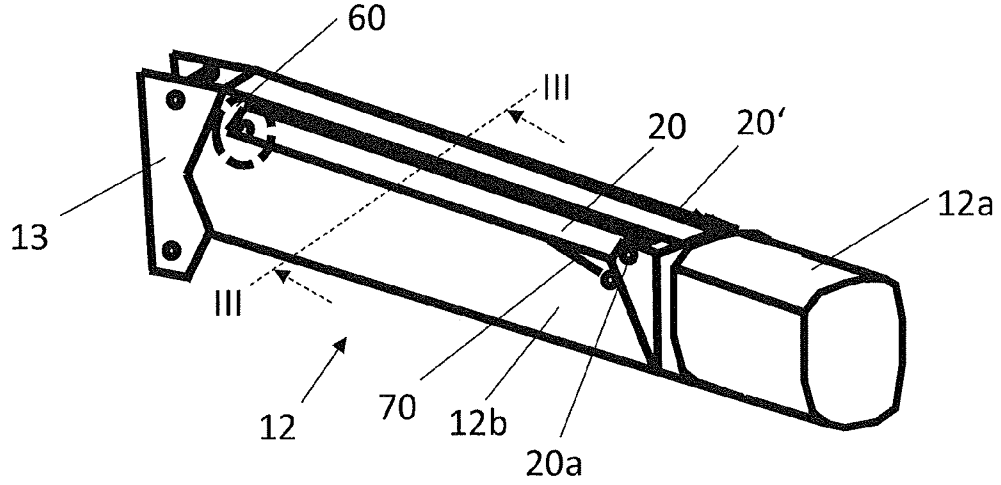
FIG. 9 shows a schematic perspective view of an inner box with two masts in the transport position or inoperative position.

FIG. 9 shows a schematic perspective view of an inner box 12 with two masts 20, 20' which can be folded out. A telescoping jib 10 with a plurality of inner boxes 12 is the innermost inner box 12'. The telescoping jib head 13 is arranged at one end of the inner box 12. At the other end of the inner box 12 is the overlap region 12*a* with respect to the basic box 11 or with respect to the next-outermost inner box 12''. The inner box 12 consists of a main support 12*b* and the overlap region 12*a*. The main support 12*b* is adjoined by the overlap region 12*a* and possibly in an opposing arrangement the telescoping jib head 13. The main support 12*b* is a region of the inner box 12 with a smaller cross-section. The cross-sections of the overlap region 12*a* and of the main support 12*b* are shown in a simplified manner as a rectangle and hexagon in the illustration. However, both cross-sections preferably have a mutually tailored shape and are preferably rounded as shown in the cross-sectional view according to FIG. 10.

In the region of the main support 12*b*, two masts 20, 20' are arranged in the inoperative position illustrated in this case, each on one side of the main support 12*b*. The masts 20, 20' are connected in an articulated manner to the inner box 12 in each case via a fold-out joint 20*a*. A deflection means 60 is rotatably mounted at the free end of each mast 20, 20'. The deflection means 60 are arranged in such a way that, with the masts 20, 20' folded in and the telescoping jib 10 retracted, they can be jointly transported having been mounted thereon. The deflection means 60 is in each case preferably a pulley and serves to deflect the connecting means 40 which is used for the guying of the mast 20, 20' with respect to the telescoping jib head 13. Alternatively, the deflection means 60 can in each case be arranged on the telescoping jib head 13.

Each mast 20, 20' can be erected by means of an auxiliary apparatus 70 which preferably comprises a telescopable cylinder. For this purpose, the auxiliary apparatus 70 is arranged and fastened at one of its ends on the inner box 12 and arranged and fastened at its other end on the mast 20, 20'. The fastenings are preferably mounted in a rotationally articulated manner and so the change in the angle between the auxiliary apparatus 70 and mast 20, 20' taking place during erection of the mast 20, 20' is rendered possible. When the mast is guyed accordingly, the auxiliary apparatus 70 is load-free during raising and/or lowering of a load. When the mast 20, 20' is folded in, the auxiliary apparatus 70 extends substantially parallel to the mast.

Alternatively, the masts 20, 20' can be erected e.g. by means of a tensioning frame 80, not illustrated.

Figure 10:
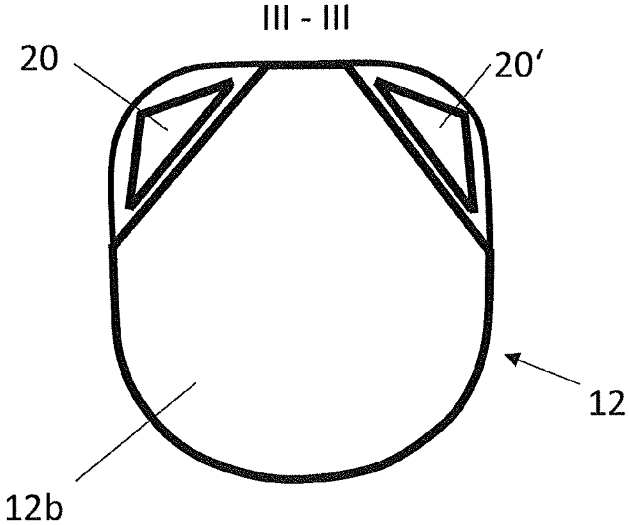
FIG. 10 shows a schematic cross-sectional view (III-III) of the inner box according to FIG. 9.

FIG. 10 shows a schematic cross-sectional view (III-III) of the inner box 12 according to FIG. 9. The masts 20 arranged on both sides of the main support 12*b* of the inner box 12 are very clear to see.

Figure 11:
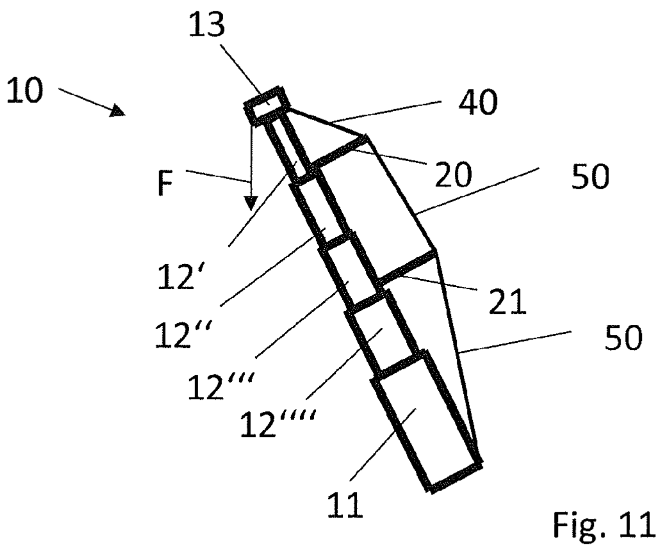
FIG. 11 shows a schematic side view of a telescoping jib with a plurality of inner boxes, a folded-out mast on the innermost and a folded-out mast on the third-innermost inner box.

FIG. 11 shows a schematic side view of a telescoping jib 10 with a plurality of inner boxes 12', 12'', 12''', 12''''. All descriptions relating to the inner box 12 or inner boxes 12 apply equally to the inner boxes 12', 12'', 12''', 12''''. In addition to the mast 20 arranged on the innermost inner box 12', a further mast 21 is arranged on a further inner box 12, the third-innermost inner box 12''', in order to increase the load-bearing capacity of the telescoping jib 10 further in a flexible manner. This further mast 21 which can be folded out is preferably C-shaped. However, an embodiment with two independent masts 21, as described above for the mast 20, 20', is also possible. Thus, if a further increase in load-bearing capacity is necessary, this can be achieved by means of the further mast 21 or the masts 21. Each mast 21 can be folded out and possibly telescoped. Provision is made for this mast 21 also to be able to remain on the third-innermost inner box 12''' when said box is pushed into the next-outermost, the fourth-innermost, inner box 12''''. The mast 21 can be used to erect the mast 20. For this purpose, the mast 21 can preferably be erected first and then the mast 20. Both masts are preferably erected using the connecting means 50. It is also possible for a further connecting means to be used between the masts 20, 21 and for the masts 20, 21 to be guyed with respect to each other thereby. The mast 21 would in this case be erected using the connecting means 50, the mast 20 would be erected with the further connecting means.

It is very clear to see that when the third-innermost inner box 12''' is in the fully extended position, the mast 21 is arranged with its foot in the region of the third-innermost inner box 12''' adjoining the overlap region with respect to fourth-innermost inner box 12''''. In principle, an arrangement of the foot of the mast 20 in the half of the third-innermost inner box 12''' orientated towards the overlap region 12*a* with respect to the second-innermost inner box 12'' is also possible.

Otherwise, the statements relating to FIG. 4 also apply to the embodiment illustrated in FIG. 11.

Figure 12:
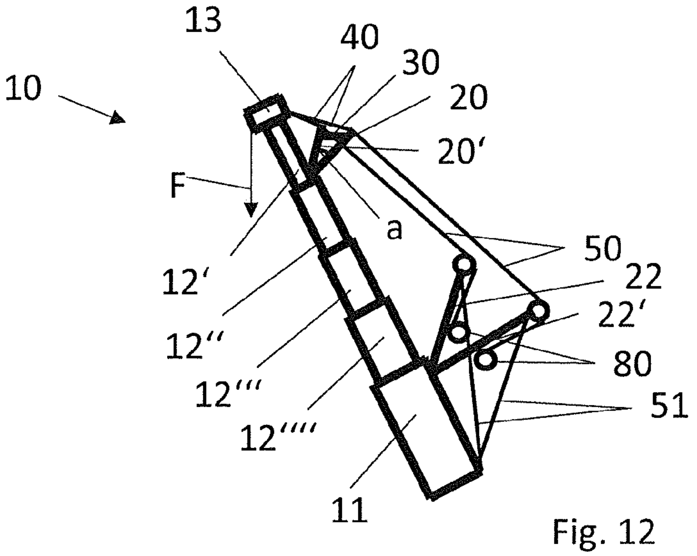
FIG. 12 shows a schematic side view of a telescoping jib with a plurality of inner boxes and two mounted additional masts.

FIG. 12 shows a schematic side view of a telescoping jib 10 with a plurality of inner boxes 12', 12'', 12''', 12'''', two masts 20, 20' which can be folded out and two mounted additional masts 22, 22'. The connecting means 40, 50 engage each fold-out mast 20, 20' respectively at the free end thereof. The masts 20, 20' which can be folded out are each connected by the connecting means 50 to the mounted additional mast 22, 22' and can be guyed with respect thereto. A tensioning frame 80 arranged on each of the two mounted additional masts 22, 22' is used to pretension the connecting means 50. The mounted additional masts 22, 22' are connected to the telescoping jib 10 by a connecting means 51. The connecting means 40, 50, 51 together with the masts 20, 20' and the additional masts 22, 22' form a guying arrangement for the telescoping jib 10.

Otherwise, the statements relating to FIG. 8 also apply to the embodiment illustrated in FIG. 12.

Figure 13:
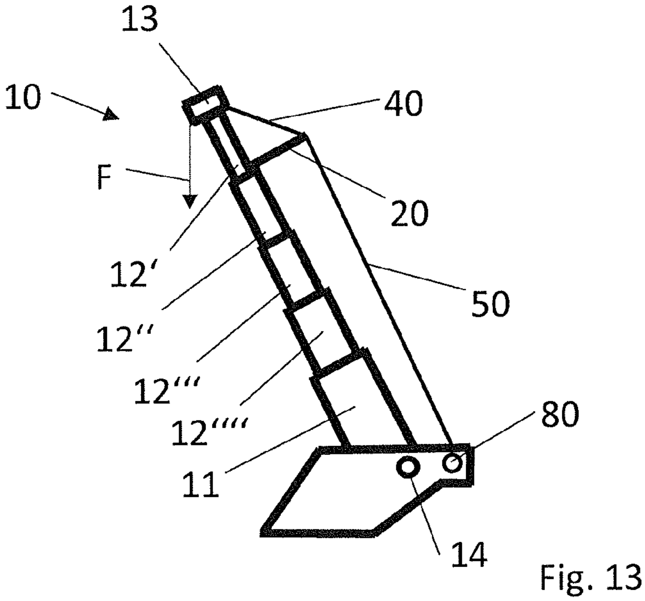
FIG. 13 shows a schematic side view of a telescoping jib according to FIG. 4 with a foot bearing and tensioning frame.

FIG. 13 shows a schematic side view of a telescoping jib 10 according to FIG. 4 with a foot bearing 14 and tensioning frame 80. The telescoping jib 10 is luffably mounted by means of the foot bearing 14. The mast 20 can be erected and guyed by means of the tensioning frame 80 and the connecting means 50 which preferably comprises a cable. The tensioning frame 80 comprises a winch frame which is arranged on the foot bearing 14. However, it is also possible for the winch frame to be arranged on the basic box 11. Alternatively it is also possible for guying to be carried out only by a connecting means 50 without a tensioning frame 80, e.g. via a cable or rod. The tensioning frame 80 comprises a luffing cable cross-member, preferably for multiple cable reeving. By means of the luffing cable cross-member it is possible to ensure guidance of the cable without a considerable amount of diagonal pull. One or a plurality of guying cylinders, which pretension the connecting means in the region of the telescoping jib head or telescoping jib foot with a predetermined force, could be used in conjunction with or without a winch frame.

Otherwise, the statements relating to FIG. 4 also apply to the embodiment illustrated in FIG. 12.

Figure 14:
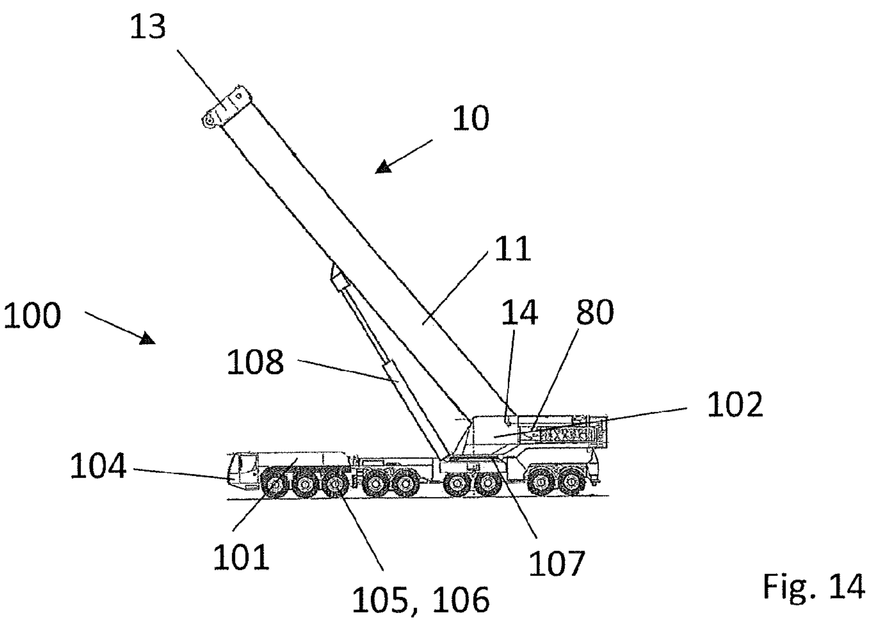
FIG. 14 shows a schematic side view of a vehicle crane which can travel on the road, with a telescoping jib in accordance with the invention.

FIG. 14 shows a schematic side view of a vehicle crane 100, in particular a mobile crane, which can travel on the road, having a lower carriage 101 and a superstructure 102 arranged to be able to rotate on the lower carriage 101 via a rotational connection 107 about a vertical axis of rotation. The superstructure 102 and lower carriage 101 can alternatively also be rigidly mounted one on the other. A telescoping jib 10 in accordance with the invention is mounted on the superstructure 102 via a foot bearing 12 and can be luffed by a luffing cylinder 108. The telescoping jib 10 is shown erect but can also be laid on the lower carriage 101 when the inner box 12 is fully retracted, in particular for the purpose of road travel.

The telescoping jib 10 is illustrated schematically in the form of the basic box 11 and has a plurality of inner boxes 12, not shown for reasons of simplification, which are arranged one inside another and can be telescoped out. The illustrated telescoping jib head 13 is arranged on the innermost inner box 12'. For an increase in load-bearing capacity, the telescoping jib 10 can be provided with a mast 20 and/or a mast 21 and/or an additional mast 22—as described above. The mast or masts 20, 20', 21, 22, 22' of the telescoping jib 10 is/are able to be guyed and/or deflected with respect to the superstructure 102 and/or with respect to the foot bearing 14 arranged thereon. Guying can be effected e.g. by the tensioning frame 80 which can be arranged on the superstructure 102, the telescoping jib 10 and/or the additional masts 22, 22'. A load, not shown, can be lifted by a lifting mechanism which is also arranged on the superstructure 102.

The lower carriage 101 additionally comprises nine vehicle axles 105 which are each provided with two rubber-tyred wheels 106 suitable for road travel. The lower carriage 101 can naturally comprise more or less than nine vehicle axles 105 or alternatively can comprise a crawler track. The vehicle crane 100 has a driver's cabin 104.

It is self-evident that the principle of the present invention can also be applied to crawler cranes. In addition, other applications of the telescoping jib 10, e.g. fixedly installed on a ship, are possible.

The invention claimed is:

1. A telescoping jib comprising:

a plurality of boxes comprising a basic box and at least one inner box; and at least one mast that is configured to be folded out into a folded-out position and to be folded in into a folded-in position;

wherein in the folded-in position the at least one inner box together with the at least one mast is pushed into an adjacent box in a retracted position, and wherein in the folded-in position the at least one mast extends with its longitudinal direction parallel to a longitudinal direction of the at least one inner box and the at least one mast in the folded-in position and in the retracted position does not protrude beyond a cross-section of the adjacent box.

2. The telescoping jib as claimed in claim 1, wherein said at least one inner box comprises a plurality of inner boxes arranged one inside another and together in the basic box, and wherein the at least one mast is arranged on an innermost inner box and the adjacent box comprises a second-innermost inner box, and wherein the innermost inner box together with the at least one mast is able to be pushed into the second-innermost inner box in the folded-in position.

3. The telescoping jib as claimed in claim 1, wherein the at least one mast comprises a first mast and at least one further mast, and wherein the at least one inner box comprises the at least one further mast which is articulated on the inner box in addition to the first mast as seen in a longitudinal direction of the inner box.

4. The telescoping jib as claimed in claim 3, wherein the first mast and the at least one further mast each form an angle of spread in the folded-out position.

5. The telescoping jib as claimed in claim 4, wherein between the first mast and the at least one further mast in the folded-out position a connector is arranged and is fastened respectively to the first mast and the at least one further mast, and wherein the connector comprises a cable or a strut.

6. The telescoping jib as claimed in claim 1, wherein the at least one inner box comprises an innermost inner box and at least one further inner box and wherein the at least one mast comprises a first mast arranged on the innermost inner box and an additional mast arranged on the at least one further inner box.

7. The telescoping jib as claimed in claim 6, wherein the additional mast arranged on the at least one further inner box is operable for erection of the first mast on the innermost inner box.

8. The telescoping jib as claimed in claim 1, wherein the at least one mast is C-shaped and partially surrounds the at least one inner box.

9. The telescoping jib as claimed in claim 1, wherein one or each mast of the at least one mast comprises a pulley.

10. The telescoping jib as claimed in claim 1, wherein one or each mast of the at least one mast is configured to be guyed in the folded-out position with respect to a telescoping jib head by a connector.

11. The telescoping jib as claimed in claim 10, wherein the connector comprises a rod and the at least one mast is arranged at a preset distance from the telescoping jib head, and/or the connector comprises a cable and the at least one mast is able to be guyed in such a way that the angle between the at least one mast and the telescoping jib is variably adjustable in a range between 10 degrees and 170 degrees.

12. The telescoping jib as claimed in claim 1, wherein one or each mast of the at least one mast is configured to be erected by an auxiliary apparatus comprising a telescopable cylinder and/or a cable pull.

13. The telescoping jib as claimed in claim 1, wherein one or each mast of the at least one mast is configured to be erected by a telescoping movement of an inner box on which the respective mast is arranged.

14. The telescoping jib as claimed in claim 1, wherein a foot of the at least one mast is arranged adjacent to the basic box, or a foot of the at least one mast is arranged on a region of an inner box adjoining a next-outermost inner box, which region amounts to 10 to 35% of the overall length of the inner box.

15. The telescoping jib as claimed in claim 1, wherein one or each mast of the at least one mast is configured to be erected and guyed by a tension frame and a connector, wherein the connector comprises one or a plurality of cables.

16. The telescoping jib as claimed in claim 1, wherein an additional mast is arranged on the basic box, and one or each mast of the at least one mast is configured to be guyed and/or pretensioned by a connector via the additional mast.

17. The telescoping jib as claimed in claim 1, wherein the at least one inner box comprises a last inner box and a second-innermost inner box, and wherein the at least one mast comprises a fold-out mast arranged on the last inner box, and wherein parts of the fold-out mast of the last inner box protrude from the second-innermost inner box, wherein the parts comprise a head part with cable pulleys.

18. A vehicle crane comprising:

a plurality of axles and wheels;

a lower carriage;

a superstructure; and a telescoping jib mounted on the superstructure, wherein the telescoping jib comprises a plurality of boxes, and wherein the plurality of boxes comprises a basic box and at least one inner box; and at least one mast that is configured to be folded out into a folded-out position and to be folded in into a folded-in position, wherein in the folded-in position the at least one inner box together with the at least one mast is pushed into an adjacent box in a retracted position, and wherein in the folded-in position the at least one mast extends with its longitudinal direction parallel to a longitudinal direction of the at least one inner box and the at least one mast in the folded-in position and in the retracted position does not protrude beyond a cross-section of the adjacent box.

19. The vehicle crane as claimed in claim 18, wherein one or each mast of the at least one mast is configured to be guyed with respect to the superstructure of the vehicle crane by a connector.

* * * * *